United States Patent [19]
VanKuiken, Jr. et al.

[11] Patent Number: 4,723,378
[45] Date of Patent: Feb. 9, 1988

[54] EXHAUST AND RECLAIM SYSTEM FOR BLASTING ENCLOSURES

[75] Inventors: Lewis L. VanKuiken, Jr., Grand Rapids; Dale A. Hanson, Hudsonville, both of Mich.

[73] Assignee: Progressive Blasting Systems, Inc., Grand Rapids, Mich.

[21] Appl. No.: 17,541

[22] Filed: Feb. 24, 1987

[51] Int. Cl.⁴ ............................................. B24C 9/00
[52] U.S. Cl. ................................. 51/424; 55/385 R; 209/133
[58] Field of Search ................... 51/424, 425, 273; 55/385 R; 209/133

[56] References Cited
U.S. PATENT DOCUMENTS

| | | |
|---|---|---|
| 2,565,510 | 8/1951 | Martin ............................ 51/273 |
| 2,696,910 | 12/1954 | Ljungdell et al. ............... 51/425 X |
| 2,912,918 | 11/1959 | Mead ............................... 51/425 X |
| 2,935,820 | 5/1960 | Mead ............................... 51/425 |
| 3,672,292 | 6/1972 | Arnold ............................ 51/424 X |

Primary Examiner—Frederick R. Schmidt
Assistant Examiner—Shirish Desai
Attorney, Agent, or Firm—Price, Heneveld, Cooper, DeWitt & Litton

[57] ABSTRACT

An exhaust and reclaim system for a blasting enclosure having exhausting means which includes two separate exhaust paths for the exhausted blasting media. One path primarily for the heavier media is through a perforated floor into means located under the floor from whence the exhausted blasting media is separated into reusable and non-usable media. The second path primarily for the lighter media that is suspended in the compartment is through filter means located at one end of the compartment. The particles of such media are intercepted by the filter means and then dispensed into the first path of the heavier particles for subsequent separation into usable and non-usable media.

14 Claims, 23 Drawing Figures

EXHAUST AND RECLAIM SYSTEM FOR BLASTING ENCLOSURES

BACKGROUND OF THE INVENTION

This invention relates to a media blasting system of the type in which one or more workpieces are located within an enclosure and the workpiece is blasted by a media such as silica or glass which is ejected by air from a blasting gun against the workpiece. More particularly, this invention relates to an exhaust and reclaim system for the blasting media utilized in such blasting enclosure.

In the finishing of metallic parts it has been a common practice to enclose the part in an enclosure in which is located a blasting gun which forces the blasting media by air against the workpiece. In this blasting operation, the force of the media striking the workpiece and the surrounding apparatus, such as the holder of the workpiece, causes some of the blasting media to break up into fine particles which are suspended in the atmosphere of the enclosure. In such operations, the heavier media particles fall by gravity to the bottom of the enclosure where they are carried away by conveyors or air suction that draws the media from the enclosure. In addition, the air within the enclosure with the suspended media therein is drawn out of the enclosure and the media so withdrawn is discarded as waste. These systems have resulted in the waste of a substantial amount of reusable media which is an expensive material.

To our knowledge, any efforts to eliminate this waste of reusable suspended particles that are interspersed with the unusable suspended media particles within the blasting chamber has not been devised or found.

SUMMARY OF THE INVENTION

The present invention is directed to an exhaust and reclaim system for recovering both the heavier media particles which fall downwardly and the suspended media particles. More specifically, a mixture of the heavier and suspended particles are recovered together so that the entire particles collected can be subsequently separated into those particles that are reusable for blasting media and those that are disposed as waste.

The exhaust and reclaim system of this invention is characterized by providing an exhausting means for the media which initially includes separate exhaust paths, one path being located below the workpiece and the workpiece holder for causing the heavier particles of media which fall downwardly below the workpiece to be drawn out of the enclosure. A second exhaust path is located within the interior of the enclosure above the first exhaust path for exerting a drawing action on the suspended media particles which are suspended in the air within the enclosure. Located in this second exhaust path is a filter means which intercepts the suspended media particles as the exhausting means draws the suspended particles from the atmosphere within the enclosure. Then periodically filter means is caused to dispense the intercepted media particles into the first exhaust path of the heavier particles whereby the heavier and suspended particles are combined and drawn from the enclosure for subsequent separation into those media particles which are reusable as blasting media and those which are unusable and therefore constitute waste material.

In accordance with this invention, the exhaust path for the heavier media particles is provided by a pervious floor located under the workpiece holder. Under the pervious floor are a plurality of tubes having openings in the top with deflector plates that direct the heavier media particles into the tubes. A suction created on these tubes by the exhausting means draws the heavier media towards one end or side of the enclosure.

The filtering means for the suspended media particles is located at this one end or side of the enclosure where it intercepts and captures the suspended media particles as previously described and periodically dispenses them into the path of the heavier media particles as they are being drawn out of the enclosure. Thus, both the lighter and heavier media particles are combined and withdrawn together from the enclosure where they are separated by a cyclone separator into usable and unusable blasting media.

In the preferred form of this invention, we provide two separate exhaust sources, one of these exhaust sources creates a suction for pulling the heavier media through the tubes located underneath the pervious floor while the other exhaust source creates a suction that is pulling the atmospheric air within the enclosure through the filter means so as to filter the air continuously. Thus the suspended media particles within the enclosure are intercepted and captured by the filter. Periodically, this second exhaust force is reversed and pulsed air is forced through the filter in the opposite direction causing the intercepted and captured media particles to fall downwardly into the heavier particles as they are being drawn from the enclosure.

With the above described system, it should be evident that the waste of reusable media as previously described is eliminated. Further, it should be evident that the combining of the suspended and heavier media particles as briefly disclosed above requires only one separator for ultimately separating the reclaimed media particles into usable and unusable media.

BRIEF DESCRIPTION OF THE DRAWINGS

This invention and its function and operation will be further explained by the following description with reference to the accompanying drawings in which.

BRIEF DESCRIPTION OF THE PREFERRED EMBODIMENT

Figure 1:
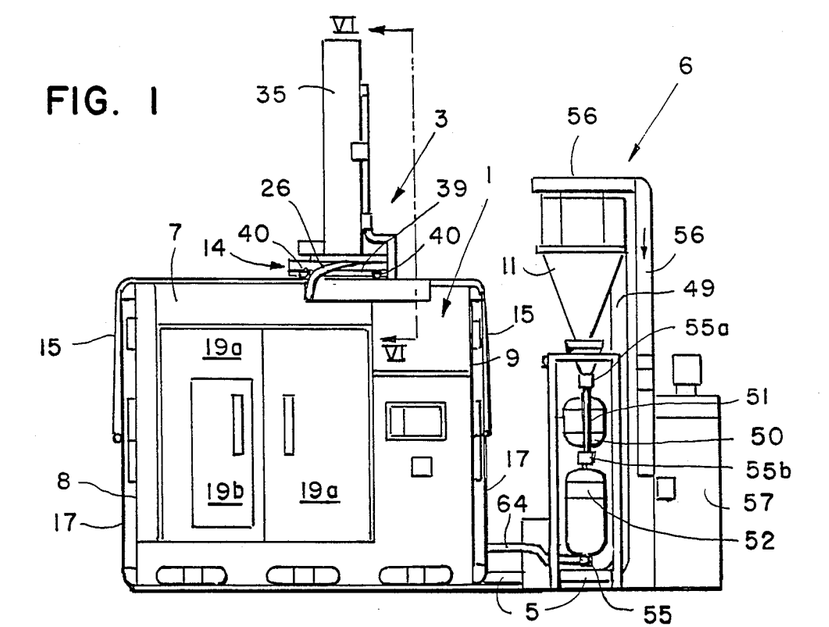
FIG. 1 is a front elevational view of a blasting system incorporating the apparatus and equipment of the exhaust and reclaim system of this invention including the blasting room and enclosure in which the blasting takes place and reclaim apparatus located adjacent thereto.
Figure 2:
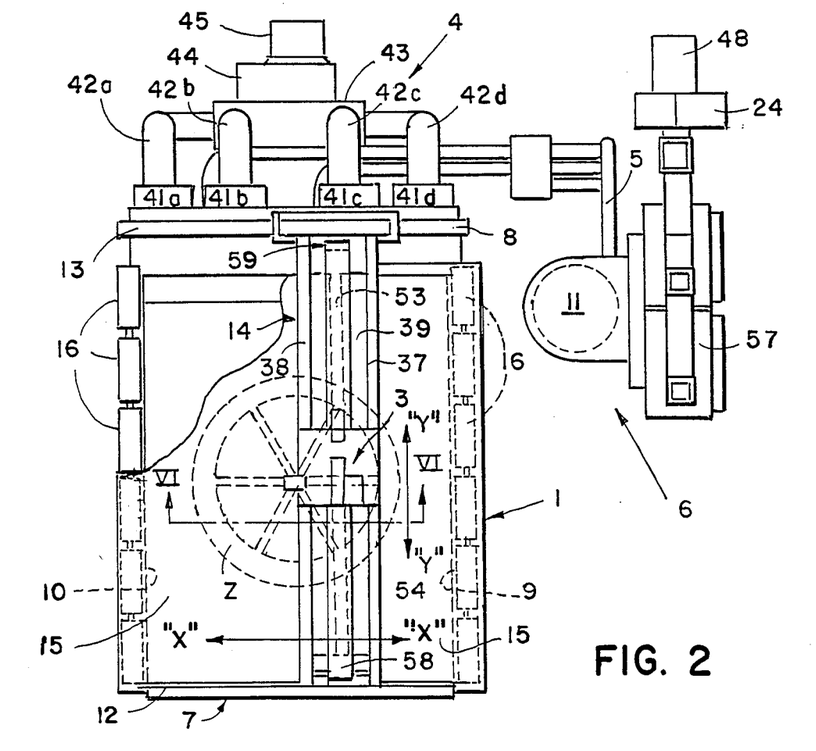
FIG. 2 is a top plan view of the apparatus and equipment of FIG. 1.
Figure 3:
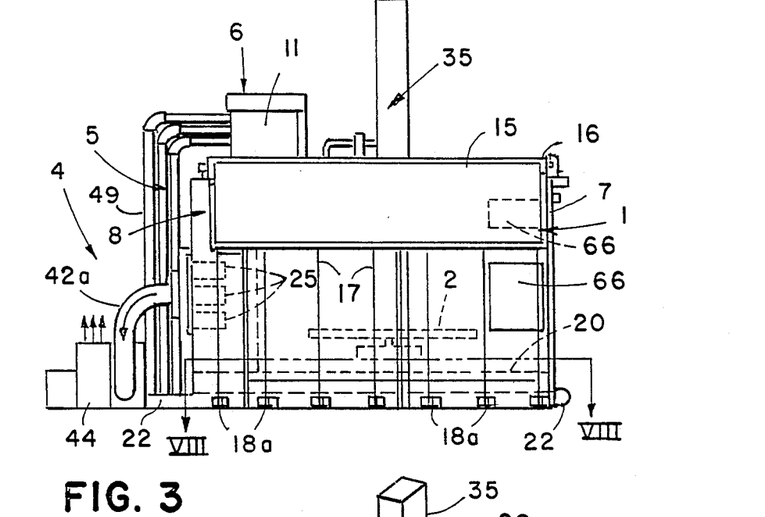
FIG. 3 is a side elevational view of the apparatus and equipment of FIG. 1.
Figures 4, 5:
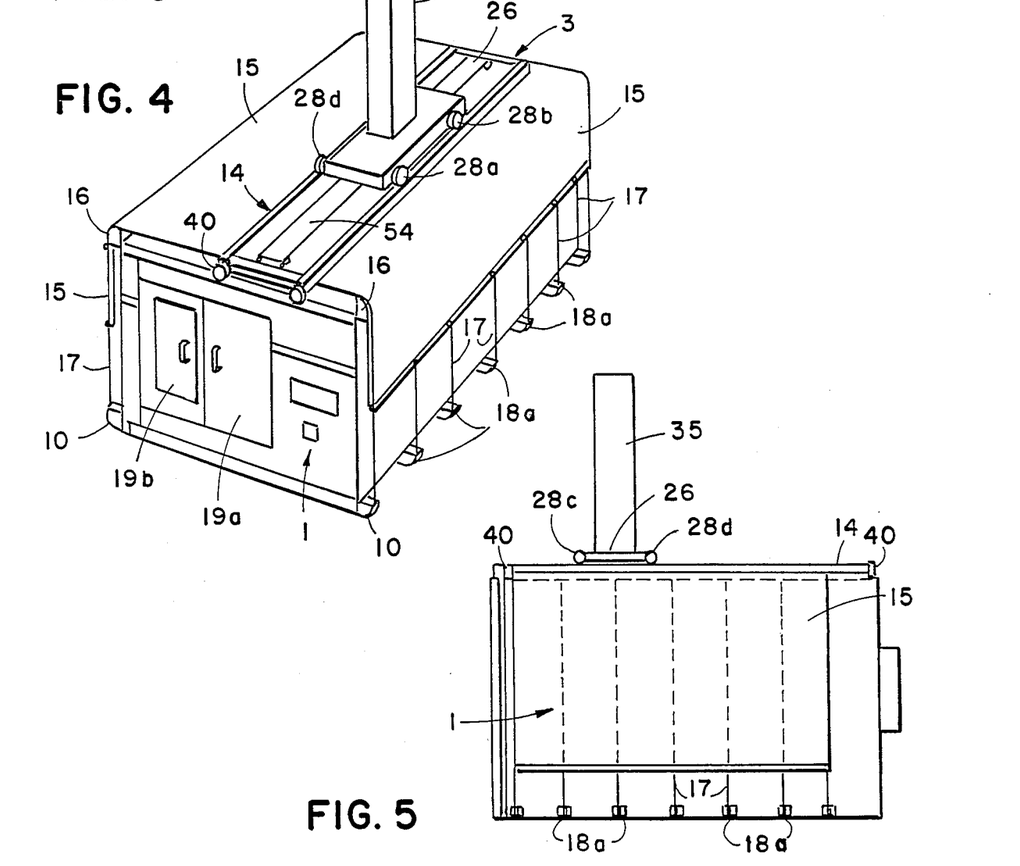
FIG. 4 is a sketch of the enclosure or room in which the blasting operation is performed.
FIG. 5 is a side elevational, schematic view of the room or enclosure illustrating the relation of the cover or belt and the cables to the room or enclosure.

Referring to FIGS. 1, 2 and 3, reference numeral 1 designates a room assembly in which is located a workpiece holder turntable 2 (FIGS. 2 and 3) for holding workpieces to be blasted by a blasting gun (not shown). A robot assembly 3 which is a telescopic transfer device is provided for supporting and controlling the position of the blasting gun with respect to the workpieces mounted on the turntable 2. As will be explained hereinafter, the robot assembly 3 is adapted to move from the front to the rear and laterally across the room assembly along the coordinates "X" and "Y" (FIG. 2). Also, the robot assembly 3 is adapted to position the blasting gun at various heights (along coordinate "Z" of FIG. 1) and at various angles within the enclosure or room assembly 1 so that the gun can be controlled to blast the workpieces from all angles.

Extending from the rear wall of the room assembly is the vent duct assembly 4 and the reclaim ducts 5 which lead to the reclaim system assembly 6 that separates the reusable media particles from the fine unusable media particles.

The room assembly comprises the front header 7, the rear header 8 and the two side panels 9 and 10. Mounted on the front and rear headers 7 and 8 are the front and rear rail assemblies 12 and 13, respectively, which support the robot base assembly 14 for lateral movement across the top of the enclosure or room assembly 1 along the "X" coordinate. A cover or belt 15 is secured to each side of the robot base assembly and extends across the open top of the room assembly and downwardly over the sliders 16 located along the top edge of each of the side panels 9 and 10. The cables 17 are secured to the cover 15. These cables 17 ride in pulleys 18 mounted between each of the slider elements 16 and pulleys 18a located at the lower edges of the side panels 9 and 10 (FIGS. 8, 9, 10, 12, 13, 14, and 15).

The room assembly includes the doors 19a for gaining access into the enclosure within the room for loading the workpieces on the turntable 2. A smaller door 19b is provided in one door 19a to permit easier access for those who are operating and maintaining the system.

Figure 19:
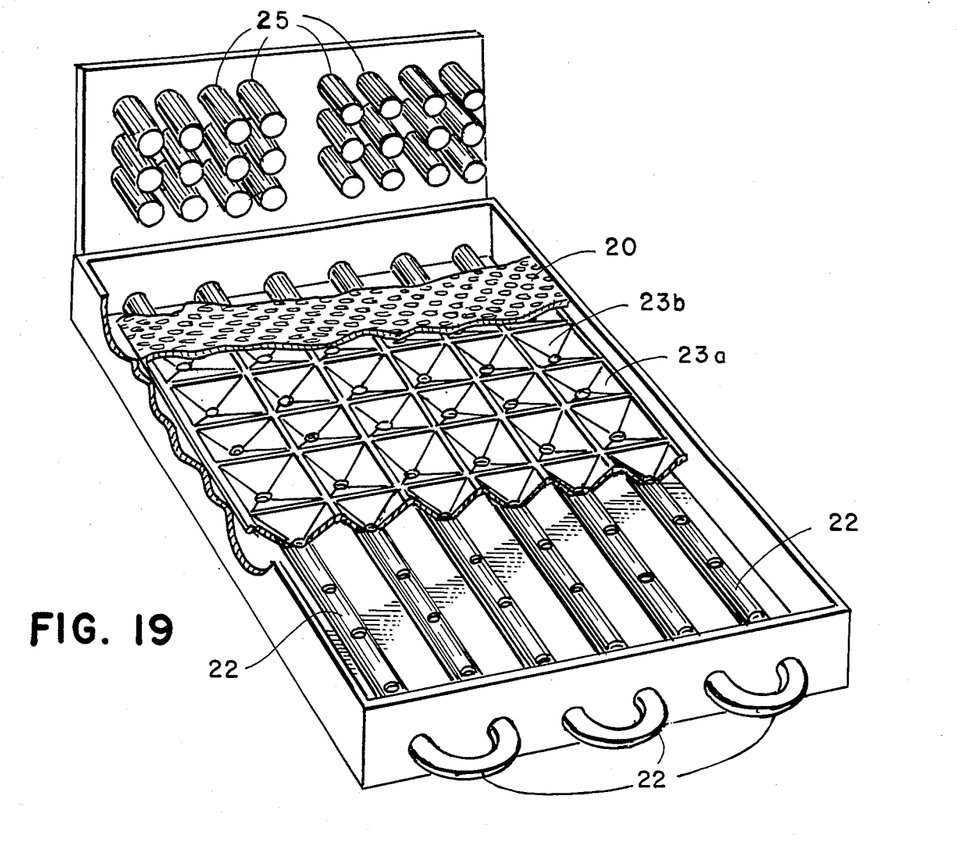
FIG. 19 is a schematic perspective view of the tubing located under the floor of the room and illustrating the position of the deflector plates for directing the blasting media into the tubes, this figure also schematically disclosing the filter units mounted in the end of the enclosure.
Figures 20, 22:
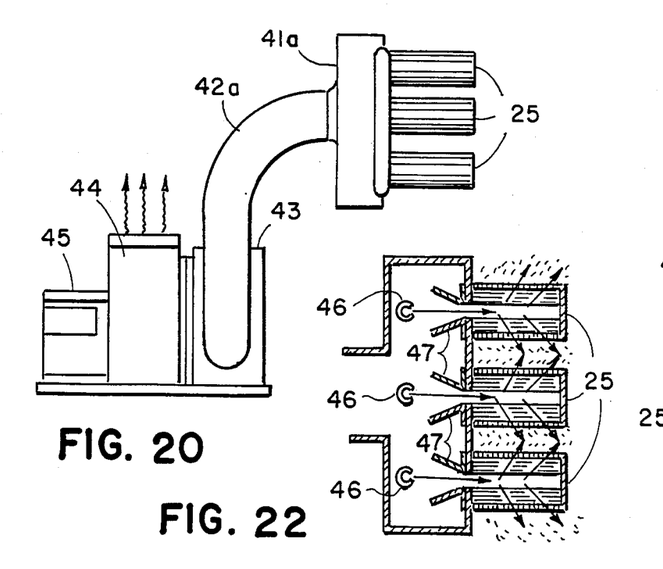
FIG. 20 is a side elevational view of the vent duct assembly of FIG. 18 and also disclosing the position of the filter units with relation to such vent duct assembly.
FIG. 22 is a side elevational view of three filter elements and illustrating air pulses being forced into the inside of the filter units for ejecting or dispensing the blasting media which was intercepted and collected on the walls during the filtering operation.

An important aspect of this invention relating specifically to the exhaust and reclaim system is the pervious floor 20 and the tubular conveying system 21. The pervious floor 20 is constructed of a wire mesh having openings sufficiently large for reusable media to pass therethrough. The tubular conveying system includes the tubes 22 extending from the front to the rear of the room assembly 1 and having a plurality of deflector plates 23a and 23b extending from the floor at an angle downwardly to spaced openings located in the tubes. This feature is best disclosed in FIGS. 16, 17 and 19, it being understood that for simplicity's sake FIG. 19 illustrates only a small number of deflector plates that extend downwardly at an angle to the opening in the tubes 22.

Another important aspect of this invention is the provision for two exhaust sources for exhausting or pulling the media from inside the enclosure. The first exhaust source is the motorized blower 24 which draws air through the reclaim tubes 5 into the cyclone separator 11 where the usable media particles are separated from the fine unusable particles. The second exhaust source is provided by the vent duct assembly 4 which includes suction blower 44 which draws air from the enclosure through the cylindrical filter elements 25 located at the rear of the room assembly. These filter elements are located over a portion of the perforated floor at the extreme rear end of the room assembly and are adapted for separating and collecting the media that is suspended in the air within the enclosure. The air inlets 66 are provided for drawing air from the outside of the room through the enclosure, tubes 22, and filter elements 25.

Robot Assembly

Referring more specifically to the details of the various assemblies as briefly described above, the robot assembly includes the robot base assembly 14 on which is mounted the robot cart assembly 26.

Forward, rearward and lateral movement across the top of the enclosure or room assembly 1 is made possible by the robot base assembly 14 which is mounted on the front and rear rail assemblies 12 and 13. As disclosed in FIG. 2, this robot base assembly includes two parallel rails 37 and 38 mounted on a plate 39 which by means of rollers 40 (FIGS. 1 and 7) is mounted on the front and rear rail assemblies 12 and 13 for movement laterally across the top of the room assembly 1.

The plate 39 of the robot base assembly 14 has an elongated opening 53 extending substantially the entire length of the plate and through which a telescoping member 36 of the robot mast assembly 35 (to be described hereinafter) extends and is permitted to move. In order to retain the dust formed by the blasting operation within the enclosure of the room assembly 1, a belt 54 is mounted over the elongated opening 53. Take-up means 55 and 56 are located at the ends of the plate 39 for maintaining the belt 54 taut over the opening 53. Also to retain the dust within the enclosure of room assembly 1, as previously described, the cover or belt 15 is attached to each side of the robot base assembly and extends over the slider 16 along each of the edges of the side panels 9 and 10 as previously described.

Figure 6:
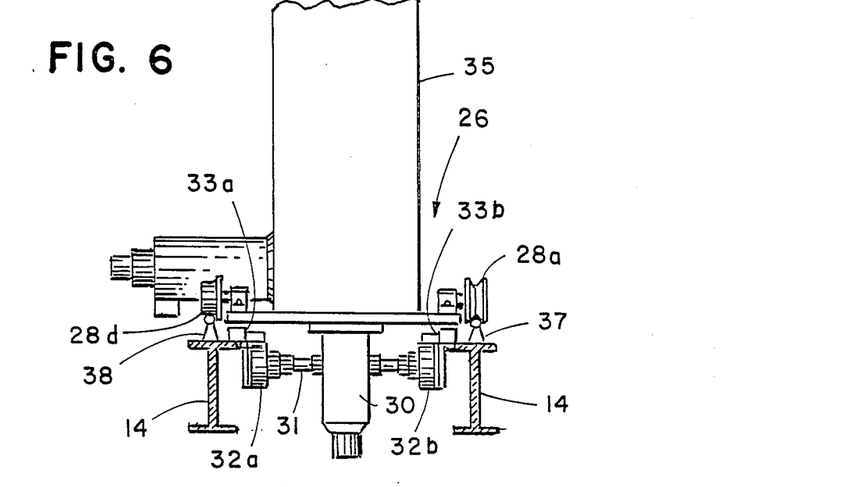
FIG. 6 is a partial sectional view taken along the plane VI—VI of FIG. 2 and disclosing the robot base assembly and robot cart assembly utilized in connection with this invention.
Figure 7:
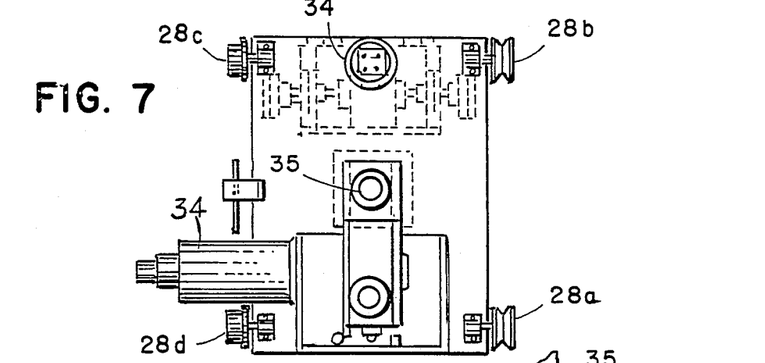
FIG. 7 is a plan view of the robot cart assembly of FIG. 6.
Figure 8:
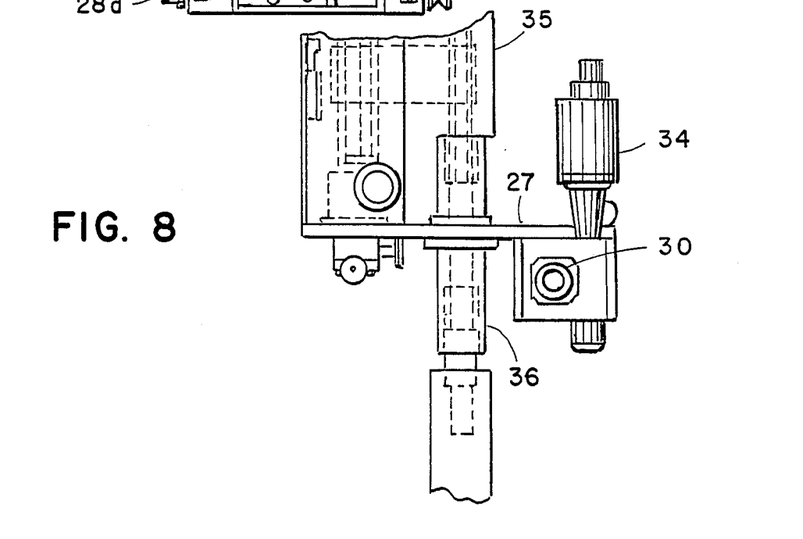
FIG. 8 is a partial, side elevational view of the robot cart assembly including a schematic illustration of the telescopic transfer device for controlling the position of the blasting gun.
Figures 9, 10, 14, 15:
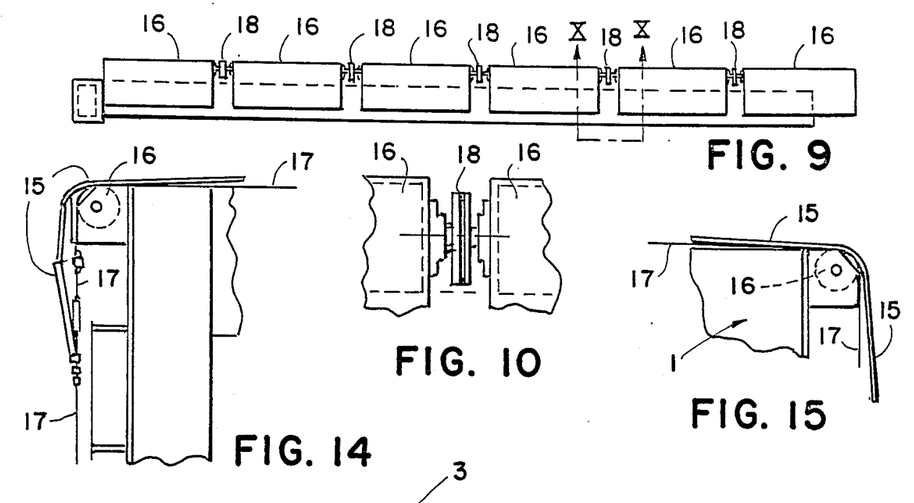
FIG. 9 is a detailed top elevational view of one of the belt slider assemblies mounted along one top edge of one side of the enclosure and on which the belt or cover for the enclosure slides.
FIG. 10 is a side elevational, enlarged view of the pulley assembly mounted between the slider elements of FIG. 9 and taken along the plane X—X of FIG. 9.
FIG. 14 is an enlarged, partial, cross-sectional view of one of the upper edges of the room of FIG. 11 and illustrating the attachment at that point between the cable, to the belt or cover.
FIG. 15 is an enlarged, partial, cross-sectional view of the other upper edge of the room illustrating the cover or belt sliding over the slider elements of FIG. 11.
Figures 11, 12:
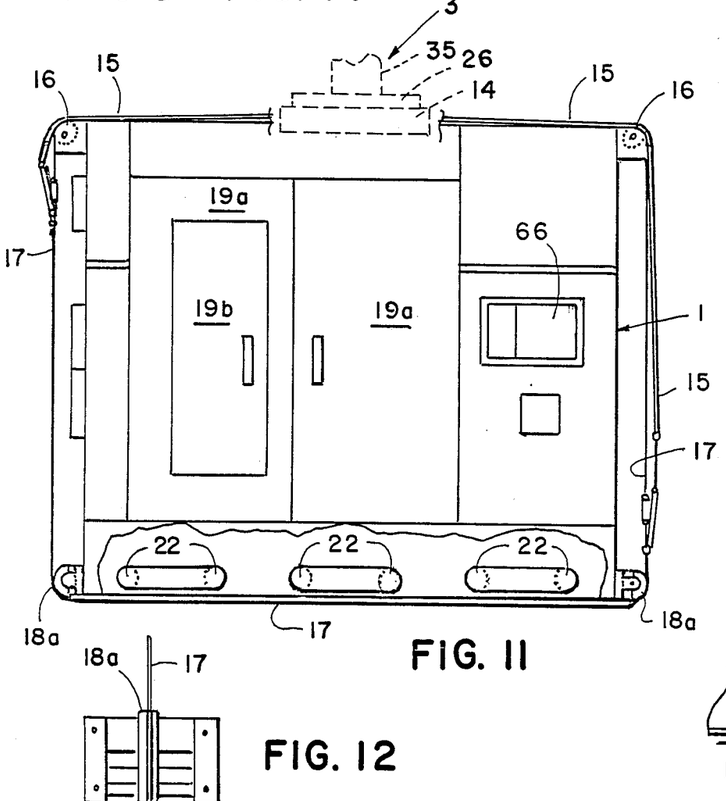
FIG. 11 is a front elevational, schematic view of the room and/or enclosure illustrating the position of the belt or cover and the cables attached thereto.
FIG. 12 is an enlarged, partial, side elevational view of one of the cable pulley assemblies located along the bottom edges of sides of the room.
Figure 13:
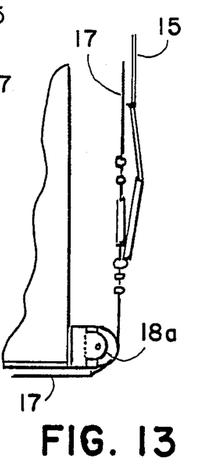
FIG. 13 is an enlarged, side elevational, detailed view of one of the lower edges of the room of FIG. 11 and illustrating the attachment at the lower edges of the cable the cover and belt.

Robot cart assembly 26 which is more specifically disclosed in FIGS. 6 and 7, includes the support plate 27 on the sides of which are mounted the rollers or wheels 28a, 28b, 28c, and 28d, which roll on the rails 37 and 38 of the robot base assembly 14. The robot cart assembly 26 is driven on the rails 37 and 38 by the motor 34 (FIGS. 7 and 8) which has a drive shaft (not shown) extending through the support plate 27 and connected to the gear reducer 30 which in turn drives the drive shaft having spur gears 32a and 32b on each end thereof. These spur gears 32a and 32b engage the gear racks 33a and 33b mounted on robot base assembly 14. Actuation of the motor 34 thus rotates the drive shaft 31 and the spur gears 32a and 32b which by their engagement with the gear rack 33a causes the robot cart assembly to travel down the rails 37 and 38 of the robot base, depending upon the direction of rotation of the motor 34, all of which is controlled by a centrally located computer control circuit (not shown) but which is well within the purview of anyone skilled in the art.

Extending upwardly from the support plate 27 is a robot mast assembly 35 having a downwardly extending telescoping member 36 extending through the plate 27 and on which a blasting gun is mounted. The tubular member 36 telescopes downwardly and upwardly and rotates all in response to the mechanism within the assembly 35 and in response to a control circuit. Thus the blasting gun is moved upwardly and downwardly and rotated with respect to the robot cart assembly 26 which in turn moves the blasting gun forwardly and rearwardly and laterally across the room so that the workpieces can be blasted from all directions.

Thus it will be evident that the robot assembly 3 is mounted for movement along the "X" and "Y" coordinates above the room assembly and by means of the robot mast assembly 35, the gun mounted on the end of the elongated support member 36 is adapted for movement along a vertical "Y" axis. Accordingly, the gun is movable for positioning at different positions on the "X", "Y" and "Z" coordinates for positioning the gun to blast the workpiece from different angles within the enclosure of the room assembly 1.

A more detailed description of the robot assembly 3 including the robot base assembly 14, the robot cart assembly 26 and the robot mast assembly 35 is set forth in our co-pending application Ser. No. 017,537, filed Feb. 24, 1987 and entitled ROBOT POSITIONER, it being understood that a broad disclosure of the robot assembly 3 is disclosed herein solely for the purpose of setting forth at least one environment in which the exhaust and reclaim system of this invention has utility.

Vent Duct Assembly

This invention relates primarily to the exhaust and reclaim system for blasting enclosures in which the pervious floor 20, the tubular conveyor system underneath the floor, the reclaim ducts 5, reclaim system assembly 6 and the vent duct assembly 4 are important components of this invention. Having previously described the media collecting system underneath the pervious floor which is provided as set forth above for the purpose of collecting the heavier particles that drop down and are drawn through the tubular conveying system 21, the system for collecting and separating the particles which are suspended or floated in the air will now be described.

As disclosed in FIGS. 18–22, this system for collecting the suspended media particles includes the vent duct assembly 4 and the filter elements 25 which are operatively connected to the vent duct assembly 4. In these figures, reference numerals 41a, 41b, 41c and and 41d designate manifolds to which are connected the ducts 42a, 42b, 42c and 42d, respectively, all of which lead to a common plenum 43. Air is drawn from the manifolds 41a, 41b, 41c and 41d through the ducts 42a, 42b, 42c and 42d into the plenum 43 by means of the suction blower 44 actuated by the motor 45. This air is ejected from plenum 43 through the top of the plenum in the directions as indicated by the arrows in FIG. 20. Secured to and extending from the manifolds 41a, 41b, 41c and 41d are six cylindrical filter elements 25 stacked three above each other as disclosed in FIGS. 19, 20 and 22 and two side by side as disclosed in FIGS. 19 and 21. These filter elements are constructed of conventional filtering material which will permit the air to pass therethrough but which intercept and collect the media on the outer surfaces of the element. Thus, as the air is drawn through these filter elements 25, into the manifolds 41a, 41b, 41c, and 41d, through the ducts 42a, 42b, 42c and 42d, into the plenum 43 by means of the blower 44, the media particles suspended in the air within the enclosure collects on the outer surfaces of the filter elements 25.

Blow pipes 46 and venturis 47 (FIGS. 21 and 22) are located inside each of the manifolds opposite each of the openings to the filters. These blow pipes 46 and venturis 47 are provided for the purpose of creating pulses of air directed outwardly into the inside of the filter elements 25 which expand the filter walls causing the media collected thereon to fall downwardly and to be drawn through the pervious floor 20 into the tubes 22 of the tubular conveying system 21 and into the reclaim ducts 5. Thus, the suspended media particles filtered by the filter elements 25 are combined with the coarser and heavier media particles that are then drawn outwardly through the reclaim ducts 5 by the motorized suction blower 24 of the reclaim assembly system 6 which will now be briefly described.

Reclaim System Assembly

The reclaim system assembly is connected to the reclaim ducts 5 and includes the suction blower 24 driven by the motor 48 (FIG. 2). The suction blower 24 draws the media through the reclaim ducts 5 upwardly in the duct 49 into a conventional cyclone separator 11. The cyclone separator 11 causes the media to be swirled like a cyclone resulting in the heavier usable media particles falling downwardly into the bottom of the cyclone separator into a pressure pot system 50 and the lighter particles to be drawn upwardly into the duct 56 from whence they are sucked into dust housing 57.

The pressure pot system 50 (FIG. 23) includes two pressure pots 51 and 52, valves 55a, 55b and 55c, valves 63a, 63b, 63c, 63d and 63e and probes 65a and 65b which control the flow of the media from the cyclone separator into the upper pot 51, the flow of the media from pot 51 into pot 52 and the flow of the media from pot 52 through the conduit 56 to the blasting gun (not shown) within the blasting room. During the normal operation of the pressure pot system, the valve 55b between the upper and lower pots is closed, the lower pot is under pressure by reason of valve 63b being closed, valve 63d being opened and valve 55b being closed, and the media is flowing to the blast guns through conduit 64 from the bottom of the pressure pot 52 through open valve 55c. During this time, the media from the reclaim ducts 5 is being returned from the blasting room 1 to the cyclone separator 11 which causes the heavier usable media to return to the upper pot 51. When the probe 65b signals that the lower pot 52 is getting low on media, the valve 55a above the upper pot 51 closes and the upper pot is pressurized by the plant air through valve 63c which is opened in response to the signal from probe 65b. When both pots are under the same pressure, the valve 55b between the upper pot 51 and lower pot opens and the media flows from the upper pot 51 to the lower pot 52.

Figures 16, 17, 23:
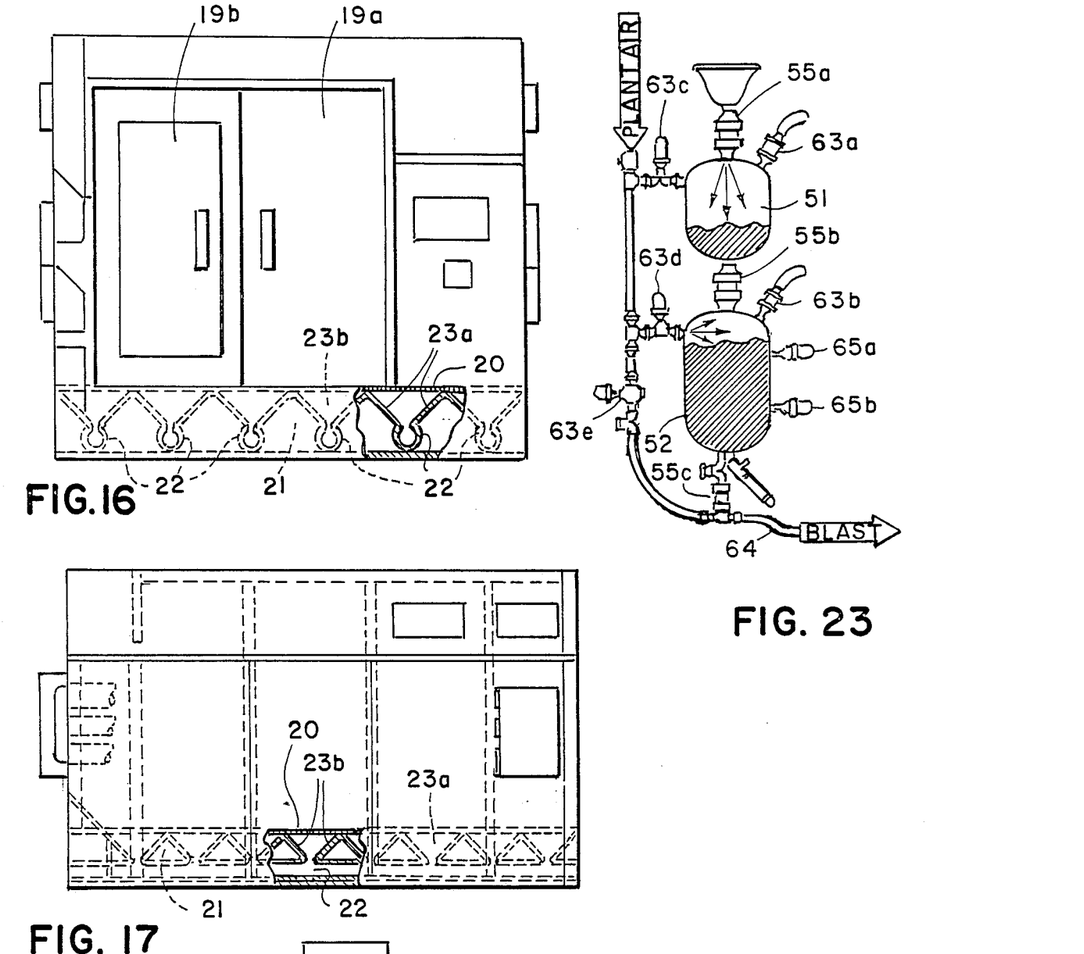
FIG. 16 is a front elevational, schematic view illustrating the position of the suction tubing with respect to the room and the floor of the room and the position of the deflector plates.
FIG. 17 is a side elevational, schematic view of the room also illustrating the position of the tubes and deflector plates under the floor of the room.
FIG. 23 is a side elevational schematic of the pressure pot system.
Figure 18:
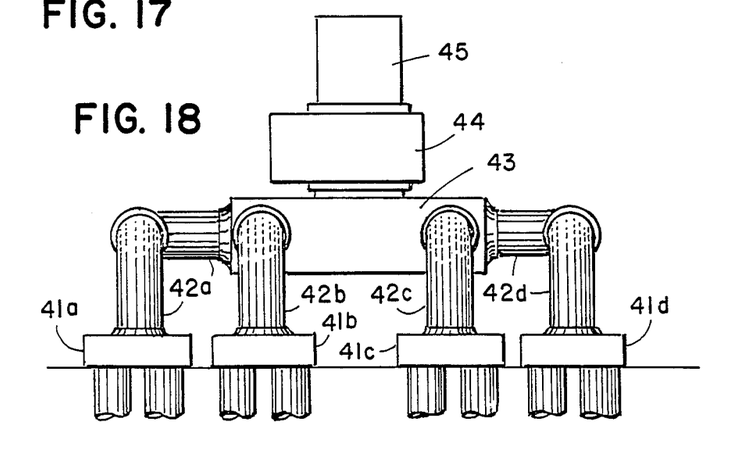
FIG. 18 is an enlarged top plan view of the vent duct assembly located at one extreme end of the room.

After a time all the media has transferred to the lower pot 52 and the valve 55b between the upper pot 51 and lower pot 52 closes and the upper pot 51 is caused to depressurize by valve 63a opening and 63c closing. At this time the valve 55c again opens.

It should be understood that other pressure pots and pressure pot systems can be used instead of the one disclosed without departing from the spirit of this invention.

The finer, lighter and unusable media particles separated from the heavier and usable particles are drawn by the suction blower 24 into the dust housing 57 where they are collected and eventually discarded.

OPERATION

Having described our apparatus and system for blasting and reclaiming the media blasting particles, the operation of this invention should become evident. Briefly, the operation begins with the blasting gun mounted in the enclosure of the room assembly and connected to the conduit 64 through which the blasting media is forced by plant air to the gun for blasting the workpieces mounted on the turntable support 2. The doors 19a and 19b are closed, the turntable 2 is set into operation and the robot assembly 3, which is controlled by a control circuit is also put into operation. The control circuit (not shown) controls the position of the robot base assembly along the "X" coordinate by controlling the operation of the drive motor (not shown) which drives the spur gears (not shown) that engage gear racks (not shown) mounted on each of the front and rear rail assemblies 12 and 13. The control circuit also controls the position of the robot cart assembly 26 along the rails 37 and 38 of the robot base assembly 14. This is accomplished by controlling the operation of the motor 34 which in turn drives the shaft 31 on the end of which are the spur gears 32a and 32b engaging the gear racks 33a and 33b. Thus actuation of the motor causes the robot cart assembly 26 to travel along the rails 37 and 38 to thus control the position of the robot assembly along the "Y" coordinate as viewed in FIG. 2.

The position of the blasting gun along the "Z" coordinate as viewed in FIG. 1 is controlled by the robot mast assembly 35 or any well-known telescopically controlled means which not only moves the blasting gun along the "Z" coordinate but also rotates the gun so as to position it for blasting the workpieces from all directions.

The above described movement of the robot assembly along the "X" coordinate as viewed in FIG. 2 is made possible by the cover or belt 15 which is secured to both edges of the robot base assembly so that in effect the ceiling for the room assembly moves with the robot base assembly. In such movement the belt or cover 15 slides over the sliders or slider elements 16 and is assisted by the cables 17 which are also connected to the robot base assembly and support the belt or cover 15. This movable ceiling construction is disclosed in more detail in the co-pending application Ser. No. 017,537 filed Feb. 24, 1987 entitled ROBOT POSITIONER.

As the cart assembly is moved along the "Y" coordinate the elongated member 36 of the robot mast assembly 35 extends downwardly through the elongated opening 53 of the plate 39 and moves along this opening 53. In order to prevent dust formed within the room from escaping through the opening 53, the belt 54 is provided to always cover opening 53. The belt 54 is mounted on take up pulleys at each end of the robot base assembly and these pulleys are operatively connected to robot cart assembly 26 by a chain and sprocket connection (not shown) so that the slack in the belt 54 is continually taken up as the robot cart assembly moves along the rails 37 and 38.

Figure 21:
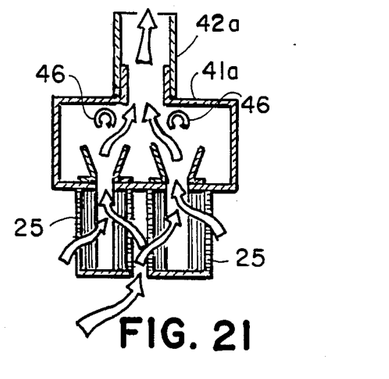
FIG. 21 is a plan view of two of the filter elements illustrating the interception of the blasting media as air is being drawn from the enclosure.

While the blasting gun is blasting the workpieces supported on the turntable 2, the heavier particles of the blasting media fall downwardly and are drawn through the pervious floor 20 into the tubes 22 which are subjected to the suction forces of the suction blower 24 which is moving air through the tubular conveying system 21 at the rate of approximately 6,000 cubic feet per minute. At the same time, the suction blower 44 is drawing air through the filter elements 25 at a rate of 14,000 cubic feet per minute. Thus the dust suspended media particles suspended in the air within the enclosure are intercepted and collected on the outer surfaces of the filter elements 25 as illustrated by FIG. 21.

Periodically the suction created by the blower 44 is interrupted and air pulses are ejected from blow pipes 46 through the venturis 47 causing the media particles collected on the outer surfaces of filters 25 to be dispensed therefrom and fall and be drawn downwardly through the pervious floor 20 to the tubes 22 where they are intermixed with the heavier particles which are all then drawn through the reclaim ducts 5 and into the cyclone separator 11.

The finer and lighter or unusable media particles are drawn upwardly from the cyclone 11 through the duct 56 into the dust housing 57 where the unusable, fine media particles are collected for discarding.

As previously described, the heavier, usable media particles fall downwardly into the pressure pot system 50 where they are finally introduced into the pot 52 from whence the media particles are carried by conduit 64 to the blasting gun located within the room assembly 1.

It should be evident from the above description that we have provided an exhaust and reclaim system for blasting enclosure, which system is continuous and collects all of the used blasting media including the heavier media particles and also the finer, lighter particles that are suspended within the enclosure. With this system a much greater portion of the reusable media is reclaimed by reason of such media that is reclaimed from the suspended media. Further, in accordance with this system, the lighter and heavier media particles are combined requiring only one separator for ultimately separating the reclaimed media particles into usable and unusable media.

Having described our invention, it should be understood that although a preferred embodiment has been disclosed herein, other modifications and embodiments can be utilized without departing from the spirit of this invention. Therefore, this invention should not be limited to only the embodiment illustrated, which has been described as an example only.

The embodiments of an invention in which an exclusive property or privilege is claimed are defined as follows.

1. In an exhaust and reclaim system for a media blasting enclosure in which there is located a workpiece holder means for holding a workpiece to be blasted, exhausting means for blasting a media against said workpiece and means for exhausting the media from said enclosure and reclaiming the same for disposal or repeated blasting operations, the improvement comprising:

said means for exhausting said media including first and second exhaust paths;

said first exhaust path being located below said workpiece holder means for causing the heavier particles of media which fall downwardly below said workpiece holder means and article means to be drawn out of said enclosure;

said second exhaust path being located within the interior of said enclosure above said first exhaust path for exerting a drawing action on the suspended media particles suspended within said enclosure;

filter means located in the said second exhaust path of said suspended media particles whereby as said means for exhausting said media draws said particles along said second exhaust path said suspended particles are intercepted and captured by said filter means; and means for periodically causing said particles captured by said filter means to be dispensed from said filter into the said first exhaust path whereby both the heavier and lighter particles are drawn from said enclosure for reclaiming or disposal as waste.

2. The exhaust and reclaim system of claim 1 in which the enclosure includes a pervious floor through which said media particles can pass and said first exhaust path includes a portion located under said pervious floor whereby the said heavier media particles which fall and are drawn downwardly through said floor are drawn by said exhausting means from said enclosure for reclaiming or disposal as waste.

3. The exhaust and reclaim system of claim 2 in which the portion of said second path under said floor is defined by a plurality of pipes extending from one side of said enclosure to the other, said pipes having openings; and means for directing said particles into said openings.

4. The exhaust and reclaim system of claim 2 in which the portion of said second path under said floor extends to one end of said enclosure and said filter means is located over said path portion at said one end whereby said particles dispensed from said filter means fall and are drawn downwardly into said first exhaust path from whence said exhausting means carries both the heavier and lighter particles from said enclosure.

5. The exhaust and reclaim system of claim 1 in which the said exhausting means includes two separate exhaust sources, one exhaust source exhausting air from said enclosure along said first exhaust path and the other exhaust source exhausting air along said second exhaust path through said filter means.

6. The exhaust and reclaim system of claim 2 in which the said exhausting means includes two separate exhaust sources, one exhaust source exhausting air from said enclosure along said first exhaust path through and under said pervious floor and the other exhaust source exhausting air along said second exhaust path through said filter means.

7. The exhaust and reclaim system of claim 3 in which the said exhausting means includes two separate exhaust sources, one exhaust source exhausting air from said enclosure along said first exhaust path through said pervious floor and pipes and the other exhaust source exhausting air along said second exhaust path through said filter means.

8. The exhaust and reclaim system of claim 4 in which the said exhausting means includes two separate exhaust sources, one exhaust source exhausting air from said enclosure along said first exhaust path through and under said pervious floor and the other exhaust source exhausting air along said second exhaust path through said filter means.

9. The exhaust and reclaim system of claim 4 in which the filter means includes a plurality of elongated filter elements spaced from each other and extending from the wall at said side of said enclosure over said path portion.

10. In an exhaust and reclaim system for a media blasting enclosure in which there is located a workpiece holder means for holding a workpiece to be blasted, exhausting means for blasting a media against said workpiece and means for exhausting the media from said enclosure and reclaiming the same for disposal or repeated blasting operations, the improvement comprising:

a first exhaust means and a second exhaust means;

said first exhaust means being adapted to draw heavier particles of media from said enclosure;

said second exhaust means being adapted to draw air carrying suspended particles of media from said enclosure;

filter means within said enclosure for intercepting said suspended particles of media carried by the air drawn from said enclosure by said second exhaust means; and means for dispensing said intercepted media particles from said filter means whereby said first exhaust means draws said dispensed lighter media from said enclosure.

11. The exhaust and reclaim system of claim 10 in which the enclosure includes a pervious floor through which said media particles can pass and be drawn by said first exhaust means from said enclosure.

12. The exhaust and reclaim system of claim 10 in which the enclosure includes a pervious floor through which said media particles can pass and be drawn by said first exhaust means from said enclosure and said filter means is located above a portion of said floor whereby said suspended media particles dispensed from said filter means falls downwardly and is drawn from said enclosure by said first exhaust means.

13. The exhaust and reclaim system of claim 11 in which said floor is defined by a plurality of pipes extending from one end of said enclosure to the other, said pipes having openings; and means for directing said particles into said openings.

14. The exhaust and reclaim system of claim 13 in which the pipes extend to one end of said enclosure, said filter means being located at said one end where the intercepted media particles are dispensed and drawn from said enclosure.

* * * * *